(12) United States Patent
Kolbe et al.

(10) Patent No.: US 8,660,054 B2
(45) Date of Patent: Feb. 25, 2014

(54) METHOD FOR SUPPORTING DISTRIBUTION OF WARNING MESSAGES

(75) Inventors: Hans-Joerg Kolbe, Darmstadt (DE); Thomas Dietz, Weingarten (DE); Marcus Brunner, Leimen (DE)

(73) Assignee: NEC Europe Ltd., Heidelberg (DE)

( * ) Notice: Subject to any disclaimer, the term of this patent is extended or adjusted under 35 U.S.C. 154(b) by 0 days.

(21) Appl. No.: 13/381,748

(22) PCT Filed: Jun. 30, 2010

(86) PCT No.: PCT/EP2010/003860
§ 371 (c)(1), (2), (4) Date: Mar. 14, 2012

(87) PCT Pub. No.: WO2011/000520
PCT Pub. Date: Jan. 6, 2011

(65) Prior Publication Data
US 2012/0163380 A1    Jun. 28, 2012

(30) Foreign Application Priority Data
Jun. 30, 2009 (FR) .................................... 09 008526

(51) Int. Cl.
*H04H 20/71* (2008.01)

(52) U.S. Cl.
USPC .......................................... 370/312; 370/256

(58) Field of Classification Search
USPC .............. 370/256, 369, 389, 395.5, 408, 420, 370/312
See application file for complete search history.

(56) References Cited

U.S. PATENT DOCUMENTS

| | | | |
|---|---|---|---|
| 7,200,598 B2 * | 4/2007 | Cherkasova | 1/1 |
| 2002/0085506 A1 * | 7/2002 | Hundscheidt et al. | 370/254 |
| 2002/0150094 A1 * | 10/2002 | Cheng et al. | 370/389 |
| 2007/0123288 A1 | 5/2007 | Hofbauer et al. | |
| 2008/0219237 A1 * | 9/2008 | Thubert et al. | 370/349 |
| 2009/0239555 A1 * | 9/2009 | Sim et al. | 455/458 |
| 2011/0014891 A1 * | 1/2011 | Bleckert et al. | 455/404.1 |
| 2011/0090828 A1 * | 4/2011 | Zhu | 370/310 |
| 2012/0040636 A1 * | 2/2012 | Kazmi | 455/404.2 |

FOREIGN PATENT DOCUMENTS

| | | |
|---|---|---|
| EP | 1 793 574 | 6/2007 |
| JP | 2002259807 A | 9/2002 |
| JP | 2005050075 A | 2/2005 |

OTHER PUBLICATIONS

International Search Report dated Oct. 11, 2010, corresponding to PCT/EP2010/003860.
ITU-T; "General View of NGN"; Dec. 2004; pp. 1-10; XP002602221.
ITU-T; General Principles and general reference model for Next Generation Networks; Oct. 2004; pp. 1-26; XP002602222.

* cited by examiner

*Primary Examiner* — Brenda H Pham
(74) *Attorney, Agent, or Firm* — Young & Thompson

(57) ABSTRACT

A method for supporting distribution of warning messages, is characterized in that an NGN (Next Generation Network) infrastructure is employed for distribution, wherein the infrastructure includes a plurality of network elements including endpoints, wherein a hierarchical architecture is defined for the network elements, wherein groups of network elements including endpoints with specific characteristics are defined, wherein each of the network elements provides its group membership information to at least one higher-tier network element, and wherein at least one group warning controller is provided that, upon receiving a request from a source node, generates a warning message for one or more target groups and forwards the warning message to lower-tier network elements of the respective target group or groups towards endpoints.

20 Claims, 3 Drawing Sheets

METHOD FOR SUPPORTING DISTRIBUTION OF WARNING MESSAGES

BACKGROUND OF THE INVENTION

1. Field of the Invention

The present invention relates to a method for supporting distribution of warning messages.

2. Description of the Related Art

Events like natural disasters, accidents, terrorist attacks etc. require to inform as many human beings and machines affected as soon as possible and with as accurate information as possible. In most cases, humans or machines in the vicinity of a specific location are affected and need quick information delivered with highest priority.

For instance, as an example illustrated in FIG. 1, one could think of a power plant accident. In such case the required actions could include the following processes and steps:
1. Inform any person in zone A: Go to Hospital xyz, and
2. Inform any person in zone B: Close windows and watch TV for news
3. Inform any machine (e.g. a local power plant or industrial production line) in zone B: Turn off to avoid worsening the impact of the emergency situation.

Conventional warning systems like sirens, broadcast radio, etc. are reaching everybody located within the respective reception area at once. For instance, currently different solutions are used, e.g., JMA in Japan (Japan Meteorological Agency, JMA, http://www.itu.int/ITU-D/tech/StandardizationGap/Tokyo2007/Presentations/9.MIC%20Murakami.pdf, and http://www.jma.go.jp/jma/en/Activities/telecommunications.html), EAS in the U.S. (Emergency Alert System, EAS, http://en.wikipedia.org/wiki/Emergency_Alert_System, and http://www.fema.gov/media/fact_sheets/eas.shtm) or SatWaS in Germany (Satellitengestützten Warnsystem SatWaS, http://de.wikipedia.org/wiki/SatWaS, and http://www.bbk.bund.de/cln_007/nn_401590/DE/02_Themen/11_Zivilschutztechnik/04_Warnsyst/01_SatWas/SatWas_node.html_nnn=true). All these systems are based on broadcast TV or radio using mainly satellite communications to distribute the warning messages, therefore interrupting currently running programs. However, all systems are directed to comprehensive nation-wide information of the country's total population in case of an emergency, natural catastrophe, case of defense, or the like. This means that traditionally no selective way of reaching a dedicated set of people is possible.

The 3GPP EWTS study (Earthquake and Tsunami Warning System)—documented in Technical Report 23.828—describes possible solutions for sending broadcast messages to attached terminals using variants of local broadcast technologies, like for instance CBS (Communication and Broadcast Service, MBMS (Multimedia Broadcast Multicast Service), etc. Its implementations are all based on layer-2, and, again, no means are provided for selecting recipients of the warning messages.

Another example of a warning system for earthquakes, which was developed by NTT, is based on best effort transmissions (see for reference https://506506.ntt.com/internet/jishin/). The system employs IPv6 multicast technology for providing Internet-based early-warnings that appear on the screens of IPv6-compatible computers. Similarly, CWarn.org has been developed as a global tsunami warning and alert system (www.cwarn.org). CWarn monitors global earthquake activity and alerts its members, via an SMS text message on their mobile phones, should a tsunami threat be forecast for their particular location. Both systems do not allow for a personalization of the warning message distribution process. Furthermore, both systems are strictly bound to the communication technology that is employed, i.e. to IPv6 multicast messages or to SMS text messages, respectively.

BRIEF SUMMARY OF THE INVENTION

It is therefore an object of the present invention to improve and further develop a method of the initially described type for supporting distribution of warning messages in such a way that the generation of a dedicated recipient group for specific warning messages becomes readily possible, while at the same time the distribution process shall be as flexible and economic as possible.

In accordance with the invention, the aforementioned object is accomplished by a method in which an NGN (Next Generation Network) infrastructure is employed for distribution, wherein said infrastructure includes a plurality of network elements including endpoints, wherein a hierarchical architecture is defined for said network elements, wherein groups comprising of network elements including endpoints with specific characteristics are defined, wherein each of said network elements provides its group membership information to at least one higher-tier network element, and wherein at least one group warning controller is provided that, upon receiving a request from a source node, generates a warning message for one or more target groups and forwards said warning message to lower-tier network elements of the respective target group or groups towards endpoints.

According to the invention it has been recognized that using Next Generation Network (NGN) infrastructures to distribute notifications or warning messages to specific groups as a replacement or addition to conventional mechanisms (like sirens, for instance) comes along with the advantage of the possibility of a flexible restriction of the recipient group to users that have attached to the service and that fulfill certain criteria defined by group membership information. In this regard, by defining a group with characteristics beyond pure location information, a personalization of the distribution process is achieved. Furthermore, the method according to the invention comes along with high flexibility as it provides the possibility to use any type of multimedia stream/message that the NGN supports. Consequently, the distribution process is not bound to any specific communication technology. In addition, the warning messages can be distributed with guaranteed QoS (Quality of Service) provided by the NGN.

In the context of the present invention the term NGN is to be understood in a broad sense, and it basically follows the definition given by the ITU-T which is: A Next generation network (NGN) is a packet-based network which can provide services including Telecommunication Services and able to make use of multiple broadband, QoS-enabled transport technologies and in which service-related functions are independent from underlying transport-related technologies. It offers unrestricted access by users to different service providers. It supports generalized mobility which will allow consistent and ubiquitous provision of services to users.

The present invention considers an architecture for network elements located anywhere in the NGN (from the users' home to the core network) to attach to a higher-tier group warning controller and distribute messages from the group warning controller according to network elements attached to the respective element and their capabilities. As a result, warning messages are forwarded to lower-tier network elements of a respective target group or groups towards endpoints enabling them to render and further distribute the warning message. Generally, each network element itself can receive messages and distribute them according to information received from attached network elements and/or act as a sink, i.e. render multimedia content. Insofar, the present invention works with any device supporting normal media rendering like text, speech, pictures, video, and sound.

Furthermore, the present invention enables additional services, which are not emergency related.

According to a preferred embodiment it may be provided that the requests of the source node, which can be either network-based or a local sensors or a combination, e.g., a Tsunami warning management system, includes priority information. For instance, the requests could be assigned a priority value of a scale ranging from e.g., 1 to 10, with 1 indicating the lowest priority value (employed e.g., for a hay fever pollen warning) and 10 indicating the highest priority value (employed e.g., for a tsunami or earthquake warning). Additionally or alternatively, the requests may specify the media type, and/or may include links to the media source from which the warning message can be retrieved. In case of pure text information, it may be provided that the request includes the message itself. The links to the media source can refer to locally or centrally stored content or multicast streams. To avoid scalability issues with centrally stored content, source nodes can be distributed within the NGN infrastructure.

The requests may also include information on which specific target group is addressed. In this regard it may be provided that a locality information is either included in the group or carried separately in any appropriate format, which may be based e.g., on network topology information or on geographic coordinates. In the latter case the group warning controller would have to map the geographic coordinates to the network coordinates (e.g., DSLAM xyz . . . ).

With respect to an efficient and precise selection mechanism for the distribution of warning messages it may be provided that target groups are defined on the basis of a network element's location. For instance, a group may be formed by all network elements that are located in a specific building, or by all network elements that are located in greater Tokyo area. The location of a network element may be identified by a network management database. The location of a network element that is an endpoint—which is a UE (User Equipment), like phones, laptops, set top boxes, TVs, etc., that can only render content—may be based on network attachment functions, as e.g. described by Broadband Forum TR-101. This information can be correlated with information in the customer care & billing database of the service provider. Doing so, it is possible to identify all access lines that belong to a specific postal address which can be e.g., a subset of all floors in a big office building.

Alternatively or additionally, target groups may be defined on the basis of network elements' attributes, profiles and/or capabilities, for instance taking into consideration users' diseases, users' social characteristics, and/or receiving capabilities (person can see/hear or sense vibrations, machine can turn off/on). More specifically, a group can be defined based on implementations and it can be represented by a generic identifier that corresponds to a meaning defined in the group warning controller. Group memberships can be combined. For instance, home gateway A may be a member of two target groups, the first one being defined as {Household with small kids}, and the second one being defined as {Household with members that have hay fever}, endpoint B may be a member of the group {blind person}, and home gateway A, B and C may be members of the group {located in "Main street 15, $2^{nd}$ floor"}. Based on the group membership the warning messages generated by a group warning controller can then be directed to specific groups, for example, an earthquake warning will be sent to all network elements in a specific region, or pollen alerts for people with hay fever will be sent to network elements in that area with an according group tag. In any case, by defining target groups an intelligent group warning message distribution is achieved, which includes only recipients, which need to get the message, because of their location, attributes/profile/capabilities and which avoids a wild broadcast. On the fly adaptation to the available (and possibly changing abilities of the devices is possible.

To achieve an effective and fast distribution of warning messages it may be provided that network elements render received warning messages themselves and/or forward them to attached network elements. The decision of whether to or not to forward a warning message may be based on local policies of each rendering or forwarding network element. As higher-tier network elements are aware of attached lower-tier network elements' group memberships, higher-tier network elements are enabled to make a decision on which attached network elements have to receive the warning message and which ones don't.

In addition to their group membership it may be provided that network elements, when attaching to higher-tier network elements, provide a list of their own capabilities and/or information regarding their location. By doing so, higher-tier network elements are enabled to forward warning messages in an appropriate form that matches the lower-tier network elements' capabilities, e.g., by adapting the format or the quality of the warning messages.

Each network element can also receive group warnings from locally attached sensors. It may be provided that those group warnings remain unauthorized and will only be sent downstream towards attached network elements and endpoints. A valid example for this is the fire alarm button that is present in every big building like public or office buildings. The network element attached to the sensor may send the warning to a management system up in the hierarchy, in particular to a group warning controller, to inform it on a local incident. The system receiving such a message can make a decision whether to create a group warning for other network elements out of this information based on local policies or even user interaction. For example, in case of a fire in building A, the system may decide to send warning messages to neighboring buildings C and D, and, in addition, to the fire department.

Advantageously, in order to achieve a flexible solution as possible network elements may be allowed to enrich the content of warning messages. More specifically, each rendering or forwarding network element can decide based on local policies to enrich the content of emergency warning messages by adding, replacing or changing information, e.g. by adding locally stored information with only local significance. From a standards viewpoint, those functions can be integrated in network attachment subsystems as defined by ETSI TISPAN, the Broadband Forum and 3GPP. In a concrete application scenario, for instance, a Home Gateway could add the latest picture of a local emergency exit or evacuation plan that is valid for the building as a picture to an emergency warning message (in-line, or as a download link). This information can be stored and administered locally e.g. by the facility management team. The picture will only be sent downstream towards endpoints inside the building. The type of added information, however, needs to correlate to the respective groups.

According to a preferred embodiment it may be provided that network elements wake up endpoints of the hierarchical architecture to render content in case endpoints support this function (e.g. turn on TV). To this end, use could be made of wake on LAN or any other suitable means to start the devices know to exist, but not being active. Once a device is awake, it can be forced to play out content of warning message depending on the capabilities of the device, e.g. by making use of a UPnP (Universal Plug and Play) renderer, etc.

According to another preferred embodiment it may be provided that endpoints of the hierarchical architecture give feedback on having received or played out/rendered a warning message or having executed an appropriate action. In case of emergencies it is important to obtain feedback whether a notification has reached the destination. For instance, a feedback mechanism allows authorities to determine effectiveness parameters of the warning system and to achieve improvements. According to a specific application scenario, for example, a team of firemen should know prior to entering a building if there were floors where the emergency warning had been acknowledged by local endpoints and where not. In an end-to-end terminology, the destination is either a machine that needs to execute emergency procedures or a human being. Since in the human being case it is not always feasible to wait for a commitment of the receivers, the feedback can also be given by the endpoint that renders the content. Feedback messages may include the identifier of the message and characteristics of the device that received it and the action it performed. In case of feedback from humans, specific information on "interaction" may be included.

With respect to an efficient and scalable handling of feedback notifications it may be provided that network elements aggregate received feedback and report the aggregated feedback to higher-tier network elements.

To improve reliability and safeness of the distribution process high priority warning messages (e.g. earthquake warnings) may be broadcasted to all registered network elements of the infrastructure in case no specific group information is available. By doing so, it is guaranteed that the warning system is still working even if a central building block, namely the group information provision, breaks down.

As media for distributing warning messages to persons all kind of media that are supported by the NGN may be employed, in particular TV/video streams, text messages (rendered e.g. on mobile phones), speech messages and/or mechanical messages (such as vibrations, e.g. for disabled persons). In case of warning messages directed to a machine, a simple command could be used as media as there is no need to display media.

In some cases (e.g. fire alarms where the fire had been extinguished locally and people can stay or return in their flats), there is a need for network elements, in particular endpoints, to return to displaying the content they had been showing before turning on the emergency warning. Thus, endpoints may be equipped with storage means for caching their operational state that was in operation before the warning message was received. By this means each network element is enabled to resume normal operation in case the warning message does not have to be rendered any more.

In a specific embodiment the cache mechanism can be implemented as pausing current action implicitly allowing continuing later, not losing signaling sessions, but releasing resources inside the network for emergency warning distribution. Alternatively, a re-starting of the action including new signaling may be implemented. Both methods may be implemented based on the priority of the emergency warning, e.g., in case of earthquakes there is no need to waste time or such procedures since restoration is a minor need then. Both methods can include a session key that allows the billing system to detect that the session is the renewal of a previously existing one to prevent double session billing.

Advantageously, the warning messages will be sent with appropriate QoS prioritization—for instance, having triggered a resource reservation in the network either using on- or off-path methods—by interworking with QoS system and/or resource control systems of the NGN infrastructure for guaranteed delivery of the messages and streams. The framework and functionality bases on enhancements of existing standards due to the interworking with QoS control systems, local distribution protocols (e.g., UPnP or SIP). To allow prioritization of media traffic, the messages may either implicitly trigger QoS reservations and policy enforcement on each network element they pass, explicitly trigger a resource and admission control systems (e.g., ETSI TISPAN RACS) to reserve and assign resources or convey a generated token that allows network elements/endpoints to request resources on-path. In case of not sufficient resources, existing sessions can be discontinued in case the warning has a higher priority. The message priority is set by the source, which would be the central group warning controller or a network element in the signaling path. Still, the responsible systems for QoS and admission control perform independent decisions based on their policies.

BRIEF DESCRIPTION OF THE DRAWINGS

There are several ways how to design and further develop the teaching of the present invention in an advantageous way. To this end, it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will we explained. In the drawings:

DETAILED DESCRIPTION OF THE PREFERRED EMBODIMENTS

Figure 1:
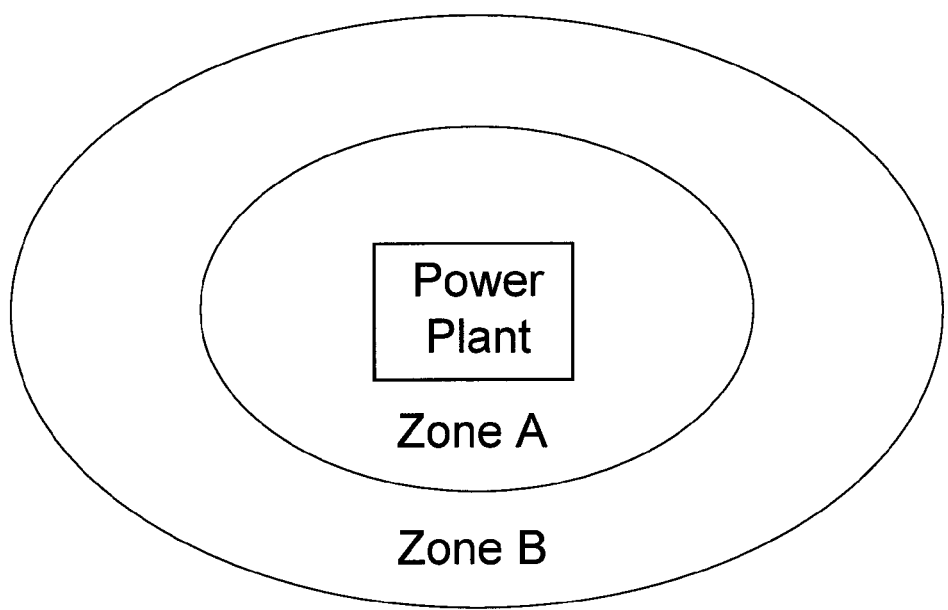
FIG. 1 is a schematic view generally illustrating different zones for distributing emergency warning messages according to the state of the art.
Figure 2:
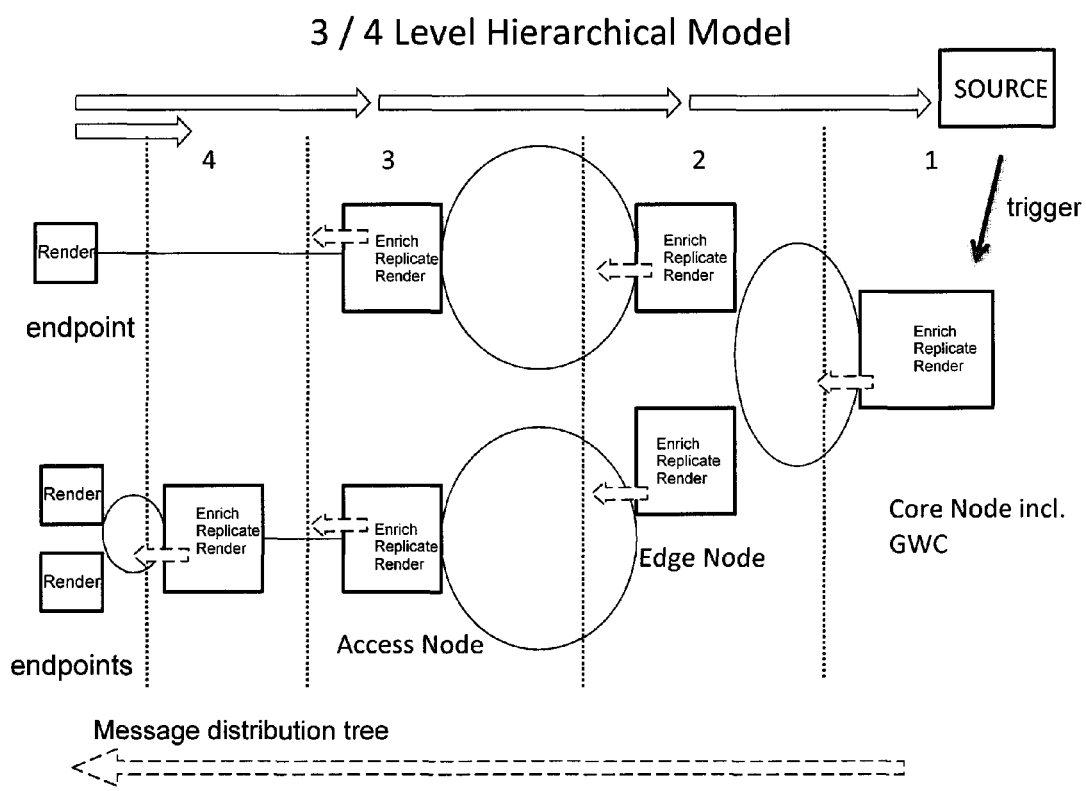
FIG. 2 is a schematic view generally illustrating an embodiment of a method according to the present invention for generating and distributing NGN-based group warnings.

FIG. 2 illustrates an exemplary hierarchical NGN architecture according to the present invention that is employed to distribute warning messages in an economic and intelligent way. The network architecture includes a plurality of network elements that are schematically illustrated by the rectangular boxes. From the right to the left these network elements are core nodes (one of which is exemplary illustrated in sector 1), edge nodes (two of which are exemplary illustrated in sector 2), access nodes (two of which are illustrated in sector 3), home gateways (one of which is exemplary illustrated in sector 4) and endpoints. The endpoints are network elements that can only render content, i.e. UEs (User Equipment) like phones, TVs or the like. UEs can also be machines without any interfaces to human users.

Each network element or endpoint needs to subscribe to the group warning message service. To do so, it sends its identity and capabilities to the network element that is located one layer higher in the hierarchy. Network elements or endpoints not having explicitly subscribed to the service may still receive group warning messages in order to widen the reachability of such messages. In case of e.g., earthquake warnings that might result in local broadcasts.

The solid line arrows in the upper part of FIG. 2 illustrate the attachment of network elements to higher-tier network elements, thereby indicating their individual capabilities and their group membership(s). Capabilities should be exchanged wherever possible using existing NASS functions, e.g. the ETSI TISPAN e3' and e3 reference points. Even an extension of the methods to 3GPP procedures is possible. The advertisement of the network elements' capabilities and groups to the higher-level network elements can be performed during initial network attachment and can be updated, if required. To this purpose existing protocols can be re-used in the access network, whereas inside the core network a modified protocol is required. Network elements that are statically connected to the network (like access nodes, routers, switches, etc.) may advertise their capabilities also with a specific protocol. Changes are transmitted in each case using interim update messages. As an alternative, each network element can also identify lower level devices that can receive and render messages based on static configuration or self-detection.

Group warning functions typically need to be implemented in Home Gateways to assure local distribution and MSANs/BRASes that can enrich data and forward based on their NASS functions. For endpoints, in the initial network attachment, the devices include their capabilities for rendering group warning content into the messages sent towards the network attachment subsystem (NASS, e.g. Home Gateway, DSLAM/MSAN or BRAS). A possible implementation could base on DHCP options or PPP vendor tags. Network elements like Home Gateways or femto cells also need to attach to the network dynamically and thus implement similar functions to those in the endpoints.

The dashed line arrow in the lower part of FIG. 2 illustrates the warning message distribution tree. In the specific embodiment of FIG. 2 the core node receives a trigger from a source node, which is an earthquake warning system that has detected an earthquake in a specific area. The trigger is a request message that includes priority information of the warning, the media type, a link to the media source from which the warning message can be retrieved, and information on which specific target group is addressed. The core node includes a group warning controller that, based on the information contained in the request message received from the source node, generates an appropriate group warning message. This warning message is rendered—stepwise—to lower-tier network elements of the addressed target groups, i.e. first it is rendered to edge nodes, from there to access nodes, to finally reach endpoints of the infrastructure. In this context "render" means either play out/display media or perform an action in the machine case, e.g. forward the group warning message to lower-tier network elements. The degree of distribution is limited based on capability, group definition, registration, and/or type of warning.

As already mentioned above, the network path towards end devices (e.g. phones, STBs, etc) includes a number of network elements that depends on network architecture and type. In the illustrated embodiment each endpoint or network element implements the following functions:

1. Forward the message to attached network elements or endpoints based on those devices' capabilities, group memberships and locations (or other attributes). For example: A DSLAM (Digital Subscriber Line Access Multiplexer) may forward the warning message to all devices attached to its line card 5, port 9-12 since they all reside on a building that is on fire.

2. Broadcast high priority messages (e.g. earthquake warnings) to all registered network elements in case no specific group information is available.

3. Render the content based on own capabilities. For example, a DSLAM can play a warning sound in case an earthquake is signaled, a TV Set could display a video, a picture frame could display a text message, a HiFi system could read a message with a speech synthesizer.

4. Stop rendering the content upon receiving an according request from the group warning controller in the higher level. Return to the old operation, e.g., continue the movie after having displayed a message for all people with hay fever to close the windows because of polls in the air.

5. Inform the billing system of the operator on the actions taken in order to prevent customers having to pay for interrupted services.

All actions listed above can be configured based on policies on the devices. There may be a need to certify devices and standardize the behavior.

Figure 3:
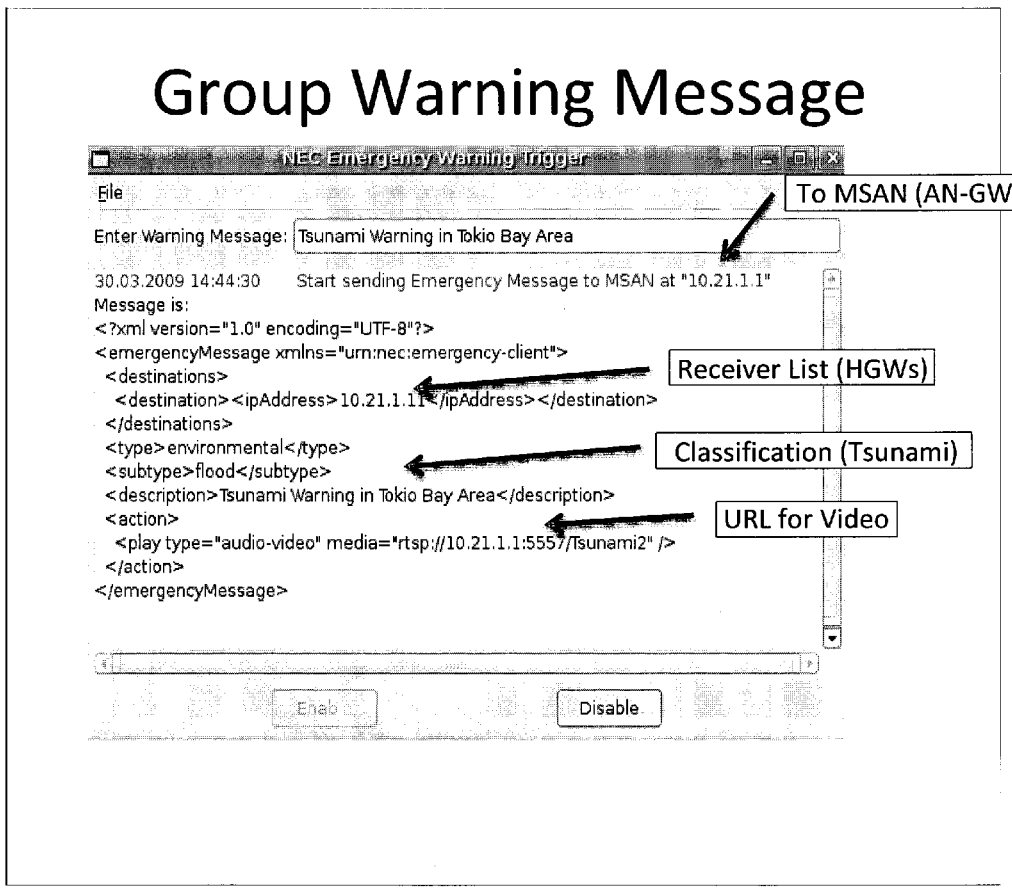
FIG. 3 is a view of a group warning message as employed in the embodiment illustrated in FIG. 2.

FIG. 3 is a screenshot illustrating an exemplary message format for a request sent by a source node, which might be e.g., a Tsunami warning centre, to a group warning controller GWC. The example is taken from a demonstrator that uses XML to describe the message type. As can be obtained from FIG. 3, in the beginning the request message includes a notification indicating that an emergency message is sent to MSAN (Multi Service Access Node) at "10.21.1.1", which is the IP address of the group warning controller GWC. To specify the target destination the request message further includes a receiver list including the IP addresses of the target home gateways HGWs. Furthermore, the request message specifies a classification of the emergency warning, which in the illustrated example is a Tsunami warning. Although not explicitly shown in FIG. 3, the classification may also include a priority indication. Finally, the request message includes an URL for the related emergency video messages. Thus, users that are contained in the receiver list and therefore receive the group warning message just have to follow the link indicated in the message to get the video displayed on their respective devices.

It is to be noted that the present invention also works with non-fixed line access as e.g. WiMax where the base station could e.g. decide to forward only text warnings because of bandwidth restrictions and the need to reach as many users as possible. The invention is also applicable to mobile networks, especially LTE (Long Term Evolution) solutions that base on IP in the access domain.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for supporting distribution of warning messages, the method comprising:
providing, by each of a plurality of network elements belonging to a group of a plurality of groups, group membership information to at least one higher-tier network element, the plurality of network elements including endpoints, a Next Generation Network (NGN) infrastructure being employed for distribution including the network elements, a hierarchical architecture being defined the network elements, each of the groups being defined to include some of the network elements including the endpoints with specific characteristics; and generating, by at least one group warning controller, a warning message for one or more target groups and forwarding said warning message to lower-tier network elements of the respective target group or groups towards endpoints, upon receiving a request from a source node.

2. The method according to claim 1, wherein the request of said source node includes priority information, media type information, links to media source, and/or information on which of the target group or groups are addressed.

3. The method according to claim 1, wherein said target groups are defined on based on a location, attributes, profiles and/or capabilities of the network elements.

4. The method according to claim 1, wherein said network elements distribute received warning messages to attached network elements.

5. The method according to claim 1, wherein said network elements attach to the higher-tier network elements with a list of capabilities of the network elements and/or with information regarding locations of the network elements.

6. The method according to claim 1, wherein said network elements, upon receiving a warning message from a local sensor, distribute said warning message to attached network elements.

7. The method according to claim 6, wherein said network elements are allowed to enrich content of said warning message.

8. The method according to claim 1, wherein said network elements wake up the endpoints of said hierarchical architecture.

9. The method according to claim 1, wherein said endpoints of said hierarchical architecture give feedback on having received a warning message and/or executed an appropriate action.

10. The method according to claim 9, wherein said network elements aggregate received feedback and report the aggregated feedback to the higher-tier network elements.

11. The method according to claim 1, wherein high priority warning messages are distributed to all network elements of said infrastructure in case no specific group information is available.

12. The method according to claim 11, wherein TV/video streams, text messages, speech messages and/or mechanical messages are employed as media for said warning messages.

13. The method according to claim 11, wherein said network elements are equipped with storage means for caching the operational state of the network elements that was in operation before one of said warning messages was received.

14. The method according to claim 13, wherein said endpoints, upon receiving a warning message, interrupt current action and continue the action later based on a same signaling session.

15. The method according to claim 13, wherein said endpoints, upon receiving a warning message, break down current action and continue the action later based on a restart including a new signaling session.

16. The method according to claim 1, wherein said warning messages are sent with appropriate Quality of Service (QoS) prioritization.

17. The method according to claim 2, wherein said target groups are defined on based on a location, attributes, profiles and/or capabilities of the network elements.

18. The method according to claim 2, wherein said network elements distribute received warning messages to attached network elements.

19. The method according to claim 2, wherein said network elements attach to the higher-tier network elements with a list of capabilities of the network elements and/or with information regarding locations of the network elements.

20. The method according to claim 2, wherein said network elements, upon receiving a warning message from a local sensor, distribute said warning message to attached network elements.

* * * * *

UNITED STATES PATENT AND TRADEMARK OFFICE
CERTIFICATE OF CORRECTION

PATENT NO. : 8,660,054 B2  Page 1 of 1
APPLICATION NO. : 13/381748
DATED : February 25, 2014
INVENTOR(S) : Kolbe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 94 days.

Signed and Sealed this

Twenty-ninth Day of September, 2015

Michelle K. Lee
*Director of the United States Patent and Trademark Office*